United States Patent [19]
Takehara et al.

[11] Patent Number: 5,977,659
[45] Date of Patent: Nov. 2, 1999

[54] INVERTER APPARATUS AND SOLAR POWER GENERATION APPARATUS

[75] Inventors: Nobuyoshi Takehara, Soraku-gun; Kimitoshi Fukae, Nara, both of Japan

[73] Assignee: Canon Kabushiki Kaisha, Tokyo, Japan

[21] Appl. No.: 08/866,119

[22] Filed: May 30, 1997

[30] Foreign Application Priority Data

Jun. 3, 1996 [JP] Japan .................................. 8-160474

[51] Int. Cl.⁶ ...................................................... H02J 3/06
[52] U.S. Cl. ............................. 307/85; 307/45; 307/126; 323/906; 363/95
[58] Field of Search ................................. 307/85, 45, 46, 307/64, 66, 125, 126, 87; 323/906; 363/95; 320/101

[56] References Cited

U.S. PATENT DOCUMENTS

| | | | |
|---|---|---|---|
| 4,588,900 | 5/1986 | Honjo | 307/66 |
| 4,652,770 | 3/1987 | Kumano | 307/46 |
| 4,697,136 | 9/1987 | Ishikawa | 323/906 |
| 5,422,518 | 6/1995 | Sashida | 307/87 |
| 5,654,883 | 8/1997 | Takehara et al. | 363/79 |
| 5,691,630 | 11/1997 | Chosa | 307/87 |

FOREIGN PATENT DOCUMENTS 58-69470  4/1983  Japan .

*Primary Examiner*—Albert W. Paladini
*Attorney, Agent, or Firm*—Fitzpatrick, Cella, Harper & Scinto

[57] ABSTRACT

In order to provide an inverter apparatus and a solar power generation apparatus in which when a main AC power system (5) has suffered, e.g., a power failure, the operation mode of an inverter (2) in the tie operation with the main AC power system (5) can be easily and safely switched from the tie operation mode to the self-support operation mode, and electric power can be supplied to a load (4) directly using normal indoor wiring, the open/closed state of a switch (3) for opening/closing a connection between the output terminal of the inverter (2) and the main AC power system (5) is detected, and the self-support operation of the inverter (2) is started when the open state of the switch (3) is detected.

28 Claims, 5 Drawing Sheets

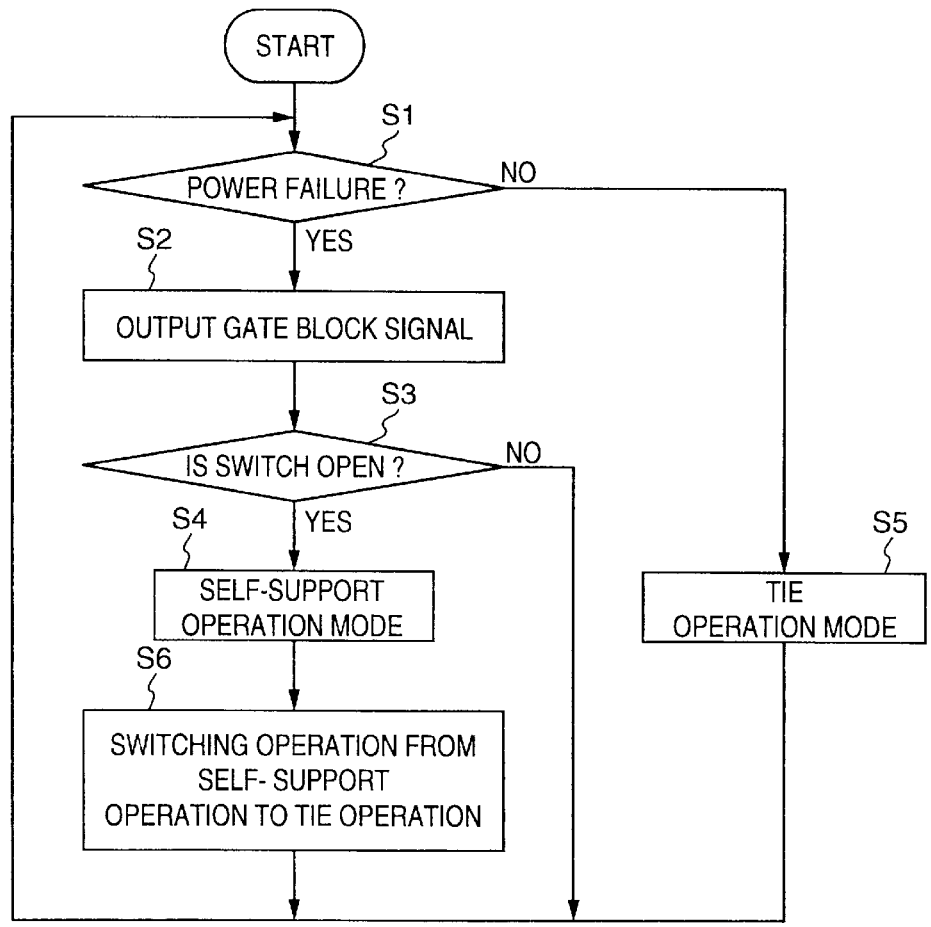
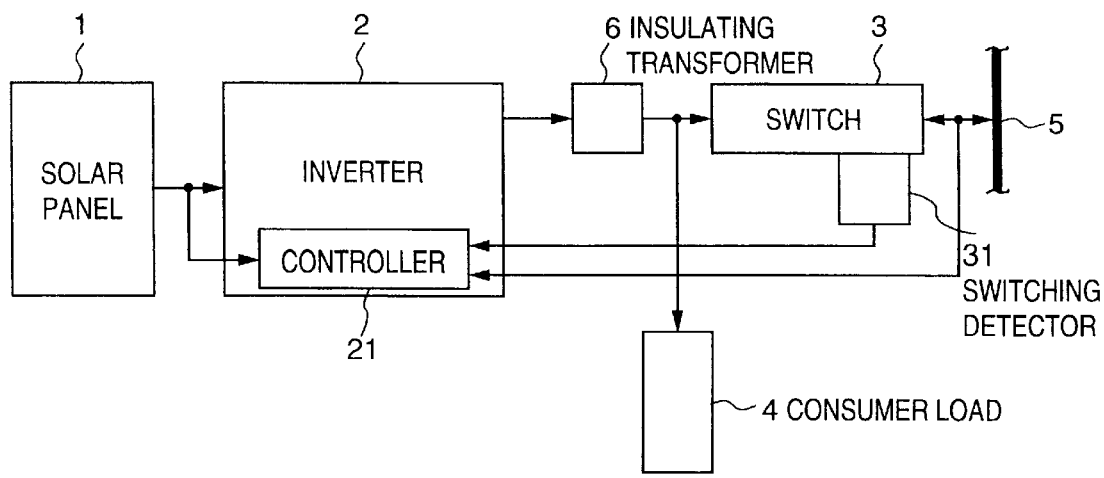

INVERTER APPARATUS AND SOLAR POWER GENERATION APPARATUS

BACKGROUND OF THE INVENTION

1. Field of the Invention

The present invention relates to an inverter apparatus for converting DC electric power into AC electric power, and a solar power generation apparatus using such inverter apparatus and, more particularly, to an inverter apparatus which has two modes, i.e., a tie operation mode with a main AC power system such as a commercial AC power system, and a self-support operation mode set upon power failure of the main AC power system, and a solar power generation apparatus.

2. Description of the Related Art

Solar power generation apparatuses are reconsidered as emergency power supplies in cases of disasters such as earthquakes. Such solar power generation apparatus comprises an inverter for converting DC electric power supplied from a solar cell into AC electric power and supplying it to consumer loads, and a switch for connecting the output from the inverter to a main AC power system such as a commercial AC power system or the like. When electric power supplied from the solar cell is insufficient for customer consumption power, the short electric power is received from the main AC power system; when electric power supplied from the solar cell exceeds customer consumption power, excess electric power is supplied to the main AC power system.

A control system of such inverter monitors the voltage waveform of the main AC power system, and ON/OFF-drives the individual switching elements of the inverter to obtain a voltage waveform corresponding to the instantaneous value and polarity of the voltage. In this inverter, when the main AC power system is cut off owing to a disaster, trouble, maintenance, or the like, a protection circuit immediately works to turn off the individual switching elements. Even when a breaker is used as the switch, the protection circuit works before the breaker opens. As a result, when the main AC power system has suffered a power failure or outage, the solar power generation apparatus itself fails to operate.

Therefore, in order to use the solar power generation apparatus using the inverter as an emergency power supply in disasters, the inverter must have a self-support operation function. For example, solar power generation apparatuses shown in FIGS. 6 and 7 are available. In FIGS. 6 and 7, reference numeral 1 denotes a solar panel built by a solar cell array; 2, an inverter; 3, a switch; 4, a consumer load; and 5, a main AC power system. Also, reference numeral 21 denotes a controller for the inverter 2; 22, an AC output switch; 23, an outlet for a self-support operation; and 24, a cord for connecting the outlet 23 and the consumer load 4.

In the system shown in FIG. 6, when the main AC power system 5 has suffered a power failure or outage, since the switch 3 is not always opened, as described above, if the self-support operation of the inverter 2 is inadvertently started, electric power is supplied to the main AC power system 5, and the inverter 2 may stop owing to an overload. Or the inverter 2 may cause an electric shock accident in the main AC power system 5. In order to solve these problems, the switch 3 must be manually opened, and thereafter, the self-support operation of the inverter 2 must be manually started.

In the system shown in FIG. 7, since the self-support operation outlet 23 alone of the inverter 2 can be used during the self-support operation, the load 4 to which electric power need be supplied must be brought to a position in the vicinity of the inverter 2 or electric power must be supplied to the load 4 via the cord 24.

SUMMARY OF THE INVENTION

It is an object of the present invention to provide an inverter apparatus and a solar power generation apparatus, which can easily and safely switch the operation mode of an inverter in the tie operation with a main AC power system from the tie operation mode to the self-support operation mode when an abnormality occurs in the main AC power system, and can supply electric power to loads directly using normal indoor wiring.

In order to achieve the above object, according to a preferred embodiment of the present invention, there is disclosed an inverter apparatus which can perform a tie operation with a main AC power system, comprising an inverter for converting input DC electric power into AC electric power, a switch for opening/closing a connection between an output terminal of the inverter and the main AC power system, first detection means for detecting an open/closed state of the switch and control means for controlling the inverter to perform a self-support operation when the first detection means detects an open state of the switch.

Also, there is disclosed a solar power generation apparatus that can perform a tie operation with a main AC power system, comprising a solar cell, an inverter for converting DC electric power input from a solar cell into AC electric power, a switch for opening/closing a connection between an output terminal of the inverter and the main AC power system, first detection means for detecting an open/closed state of the switch and control means for controlling the inverter to perform a self-support operation when the first detection means detects an open state of the switch.

Furthermore, there is disclosed a solar power generation apparatus that can perform a tie operation with a main AC power system, comprising a solar cell, an inverter for converting DC electric power input from the solar cell into AC electric power, a first switch for opening/closing a connection between an output terminal of the inverter and the main AC power system, a second switch for opening/closing a connection between the output terminal of the inverter and some of a plurality of loads, first detection means for detecting open/closed states of the first and second switches and control means for controlling the inverter to start a self-support operation when the first detection means detects the open states of the first and second switches.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a flow chart showing the operation of the control circuit shown in FIG. 2;

FIG. 4 is a block diagram showing the arrangement of a solar power generation apparatus according to the second embodiment of the present invention;

DESCRIPTION OF THE PREFERRED EMBODIMENTS

The preferred embodiments of the present invention will be described in detail hereinafter with reference to the accompanying drawings.

First Embodiment

A single-phase two-wire system (100 V output) will be exemplified below.

Figure 1:
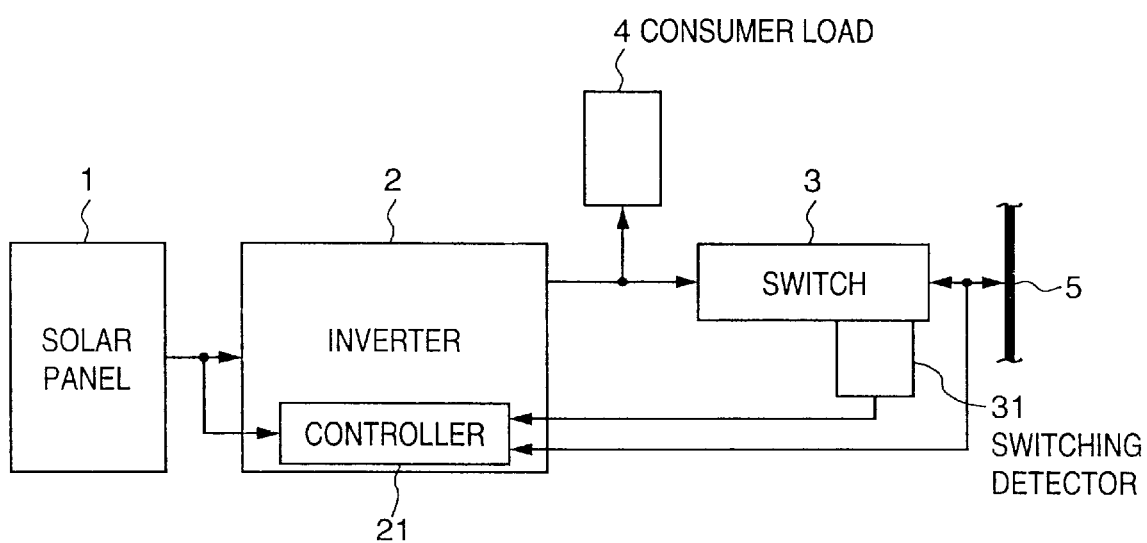
FIG. 1 is a block diagram showing the arrangement of a solar power generation apparatus according to the first embodiment of the present invention.

FIG. 1 shows the arrangement of a solar power generation apparatus according to the first embodiment. This system can perform a tie operation with a single-phase two-wire type (100 V) commercial AC power system. Referring to FIG. 1, reference numeral 1 denotes a solar panel built by a solar cell array; 2, an inverter; 21, a controller for the inverter 2; 3, a switch; 4, a consumer load; and 5, a commercial AC power system (main AC power system).

The solar panel 1 is built by series-parallel connecting a plurality of known solar cells. A solar cell uses amorphous silicon or monocrystalline silicon for the purpose of photoelectric conversion, and various types of solar cells are commercially available. In this embodiment, 56 solar cell modules (tradename: UPM880) using amorphous silicon available from United Solar Systems Corp. (USSC) are used, and four sets of 14 series-connected solar cell modules are parallel-connected to build a solar cell array which has a rated open voltage of 200 V, a rated short-circuiting current of 5.6 A, and a rated output of 1.2 kW. The number of solar modules to be series- or parallel-connected can be appropriately selected in correspondence with the input range (voltage and electric power) of the inverter 2, and is not particularly limited.

The inverter 2 preferably comprises a voltage type inverter that uses IGBTs or MOSFETs as switching elements. The inverter 2 incorporates a controller 21, which operates the inverter 2. More specifically, the controller 21 performs "current control" in the tie operation mode, and performs "voltage & frequency control" in the self-support operation mode. These control operations are known to those who are skilled in the art, and are disclosed in, e.g., Japanese Patent Laid-Open No. 58-69470 and the like. The reason why the "current control" is performed in the tie operation mode is to prevent the output from the inverter 2 from reaching an overcurrent state when the commercial AC power system has suffered a power failure or outage. In this embodiment, the inverter adopts a full-bridge circuit using four IGBTs available from Hitachi Ltd. as the switching element, and the controller 21 has an arrangement, as shown in FIG. 2.

Figure 2:
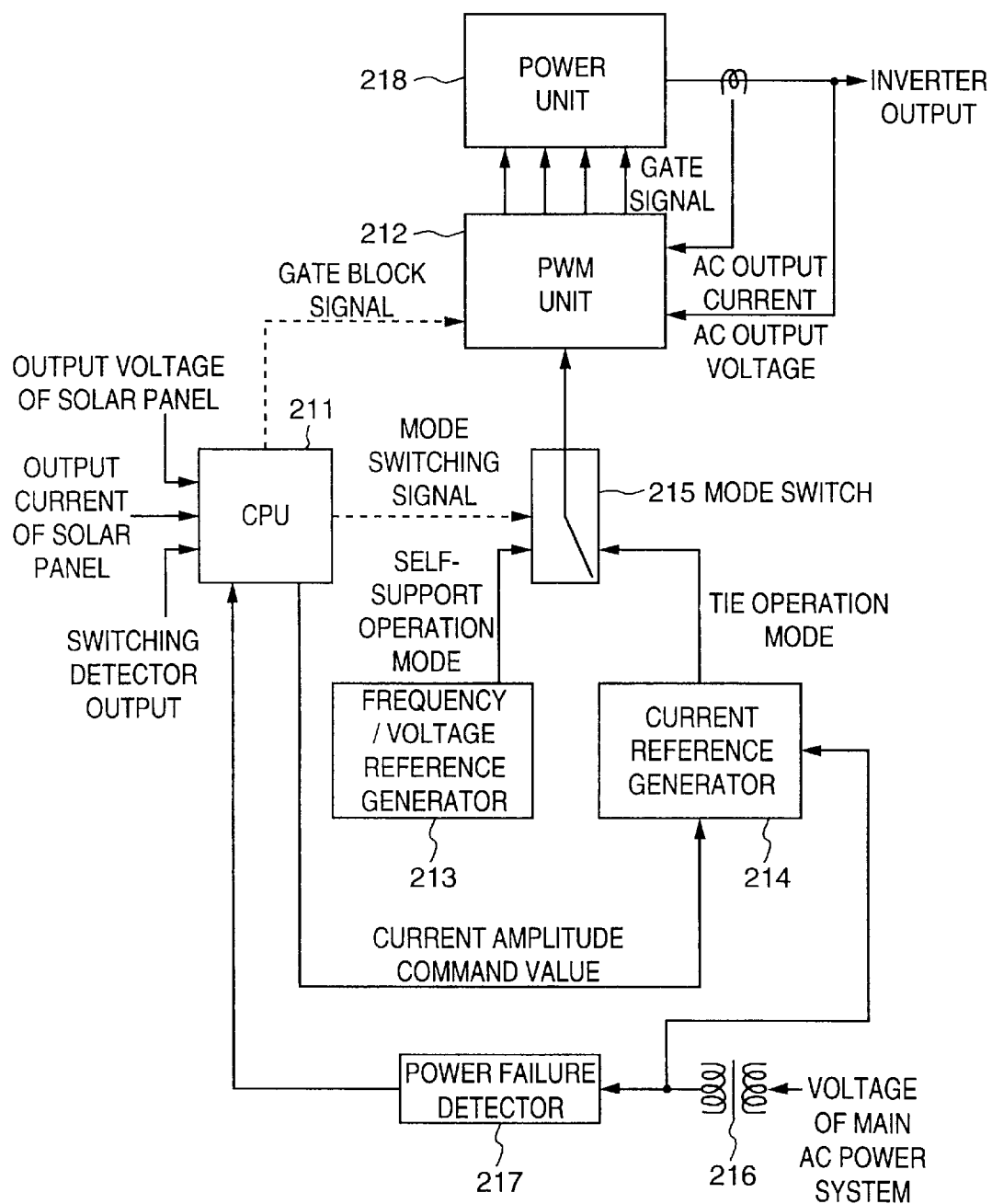
FIG. 2 is a block diagram of an inverter control circuit in the system shown in FIG. 1.

The controller 21 shown in FIG. 2 comprises a CPU 211, a pulse-width modulation (PWM) unit 212 for controlling the output waveform, a frequency voltage reference generator 231 for generating frequency and voltage reference values, a current reference generator 214 for generating a current reference value, a mode switch 215 for switching the operation mode, and a power unit 218 including the above-mentioned switching elements and the like.

The CPU 211 controls the start/stop and the operation modes of the inverter 2 in accordance with a control program stored in its internal ROM. In the tie operation mode, the CPU 211 receives the output voltage and current from the solar panel 1, and generates a current command value. In the self-support operation mode, the CPU 211 monitors the output voltage of the solar panel 1, and when the output voltage becomes equal to or lower than a predetermined value, the CPU 211 outputs a gate block signal to the PWM unit 212 to stop the output of the inverter 2.

In this embodiment, it is important that the CPU 211 have a port for receiving a signal output from a switching detector 31, and it switches the operation mode to the self-support operation mode by exploiting this signal. As a CPU that can be used for such purposes, for example, a one-chip microprocessor comprising a program ROM, a RAM for a work memory, an A/D converter, an I/O port, and the like is preferable. Also, if devices such as a program ROM, a RAM for a work memory, an A/D converter, an I/O port, and the like are appropriately combined, a CPU such as 8086 may be used. In this embodiment, V55 available from NEC Corporation is used.

The frequency voltage reference generator 213 is an oscillation circuit for generating a sine wave having a constant amplitude and a constant low frequency, and can be appropriately selected from known circuits such as a Wein bridge circuit. In this embodiment, a sine wave oscillator is built using operational amplifiers.

The current reference generator 214 generates a sine wave which has an amplitude corresponding to the current amplitude command value received from the CPU 211, and is nearly in phase with the voltage of the commercial AC power system 5. For this purpose, the controller 21 comprises a multiplier, a transformer 216 for receiving the voltage from the commercial AC power system 5, and the like, as described in, e.g., Japanese Patent Laid-Open No. 58-69470. More specifically, the CPU 211 generates a current amplitude command value on the basis of the product of the output voltage and current of the solar cells obtained using the multiplier, and the current reference generator 214 generates a sine wave having an amplitude based on the current amplitude command value, and a phase nearly equal to that of the voltage of the commercial AC power system 5.

The mode switch 215 supplies, to the PWM unit 212, a current reference value generated by the current reference generator 214 in the tie operation mode, or a voltage reference value generated by the frequency voltage reference generator 213 in the self-support operation mode, on the basis of a mode switching signal output from the CPU 211. As the mode switch 215, a relay, an analog switch, or the like can be used. In this embodiment, a compact relay is used.

The PWM unit 212 performs so-called feedback control so that the input reference value as the voltage reference value or current reference value matches the output voltage or current of the inverter 2, thereby generating gate pulses to be supplied to MOSFETs and IGBTs in the power unit 218. Such control circuit is described in, e.g., Takao Hirasa, "Power Electronics", Kyoritsu Shuppan (K.K.). In this embodiment, a triangular wave comparison type PWM waveform generation circuit using a PI control system is used.

A power failure detector 217 detects a power failure or voltage drop of the main AC power system 5 on the basis of the secondary voltage of the transformer 216, and comprises a rectifier for rectifying the secondary voltage of the transformer 216, a comparator for comparing the rectified voltage and a reference voltage, and the like. Accordingly, the power failure detector 217 outputs a power failure detection signal which indicates that the voltage from the main AC power system 5 has dropped to a predetermined value or less determined by the reference voltage.

As described above, it is indispensable for the controller 21 that it have a "voltage frequency reference" used in the self-support operation mode, and a "current reference" used in the tie operation mode, and can selectively use them, i.e., can control the operation of the inverter 2 in the two operation modes (self-support and tie modes).

The switch 3 is a so-called breaker, and is inserted between the point of power utilization such as a private house, and the commercial AC power system 5. The switching detector 31 detects whether the contacts of the switch 3 are open or closed, and normally comprises a switch which is mechanically interlocked with the contact of the switch 3, for the sake of convenience. The interlock switch is open if the switch 3 is open, and vice versa. Alternatively, an opposite logic may be used. In addition, as the output from the switching detector 31, a light-emitting signal or the like may be used. It is important that the switching detector 31 provide an output that reflects the state of the contact of the switch 3.

In this embodiment, as the breaker with such switching detector 31, a breaker (model name: NV30KB-AL) available from MITSUBISHI ELECTRIC CORPORATION is used. This breaker comprises mechanical interlock auxiliary contacts, and is very convenient for practicing the present invention. In this embodiment, the auxiliary contacts which are set in the same state as those of the switch 3 are used as the switching detector 31.

The operation of the system of this embodiment will be explained below. FIG. 3 is a flow chart showing the control procedure by the CPU 211.

In the system of this embodiment, if the power failure detector 217 detects a power failure or outage of the commercial AC power system 5 (step S1), the CPU 211 stops the output of the inverter 2 by turning off all the switching elements of the full-bridge circuit by outputting a gate block signal (step S2). After detection of the power failure, the CPU 211 detects if the switch 3 is open (step S3). If YES in step S3, the CPU 211 starts the self-support operation mode (step S4), and ceases to output the gate block signal, thus resuming the output of the inverter 2. Note that the switch 3 is manually opened.

If the commercial AC power system 5 is normal, the CPU 211 continues the tie operation mode in step S5. If the commercial AC power system 5 recovers from the power failure, the operation of the inverter 2 is manually stopped in step S6, and the switch 3 is manually closed to restart the operation of the inverter 2. With this switching operation, the operation mode is switched from the self-support operation mode to the tie operation mode. If the inverter 2 cannot be started after the switching operation in step S6, the commercial AC power system 5 is still cut off, and the self-support operation is restarted by opening the switch 3.

The above-mentioned switching operation is the safest way to return the operation mode from the self-support operation mode to the tie operation mode. However, for example, the power failure detector 217 may detect the voltage of the commercial AC power system 5, and the CPU 211 may control the operation of the inverter 2 on the basis of the detection result of the detector 217 to automatically execute the above-mentioned switching operation except for the operation for closing the switch 3.

With this arrangement, in this embodiment, power leakage to the commercial AC power system 5 can be completely prevented upon power failure or outage of the commercial AC power system 5, and the indoor wiring which is normally used can be used for supplying electric power to the load 4. For these reasons, the self-support operation of the inverter 2 can be very safely and easily performed.

Figure 7:
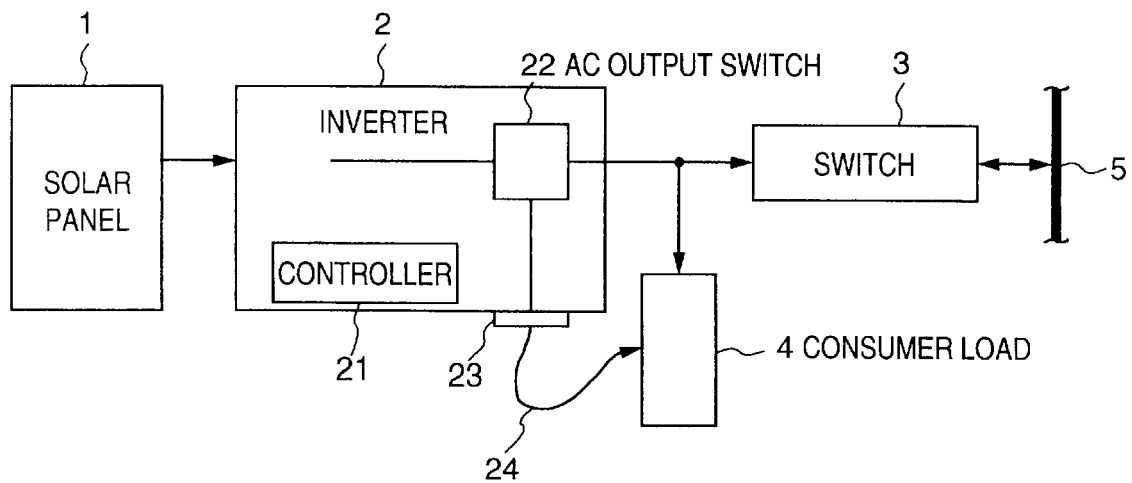
FIG. 7 is a block diagram showing the second example of a solar power generation apparatus.

In this embodiment, since the indoor wiring normally used for supplying electric power to the load 4 is directly used for power supply even upon power failure or outage of the commercial AC power system 5, no cord 24 or the like is required unlike in the system shown in FIG. 7, and the load 4 that must receive electric power need not be brought close to the inverter 2. For this reason, electric power can be easily supplied as at ordinary times.

Second Embodiment

A combination of a single-phase two-wire output (200 V) and a center-tap transformer will be exemplified below.

FIG. 4 shows the arrangement of a solar power generation apparatus according to the second embodiment of the present invention. The system shown in FIG. 4 comprises an insulating transformer 6 having a turn ratio 1:2 at the output of the inverter 6, thereby connecting the single-phase two-wire output (200 V) as the output of the inverter 2 to single-phase three-wire conductors. Accordingly, the distribution system of the commercial AC power system 5 is changed to the single-phase three-wire type. Currently, in Japan, since the single-phase three-wire type distribution system that can use both 100 V and 200 V is popular, such system is convenient for practical use. Other constituting elements can be the same as those in the first embodiment.

Even in this system, the operation flow is the same as that of the first embodiment shown in FIG. 3, and the second embodiment can be realized without any problems. It is mandatory to shift the operation mode to the self-support operation mode after it is detected that the inverter 2 is disconnected from the commercial AC power system 5.

Third Embodiment

A combination of a single-phase three-wire type inverter and a branch switch will be explained below.

Figure 5:
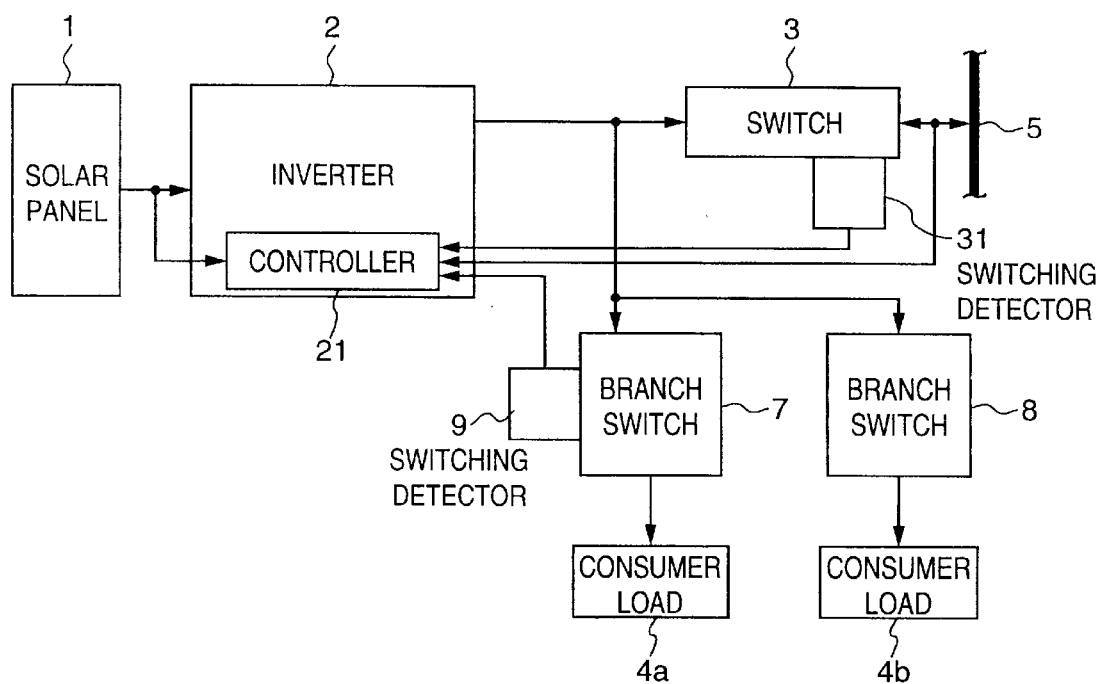
FIG. 5 is a block diagram showing the arrangement of a solar power generation apparatus according to the third embodiment of the present invention.
Figure 6:
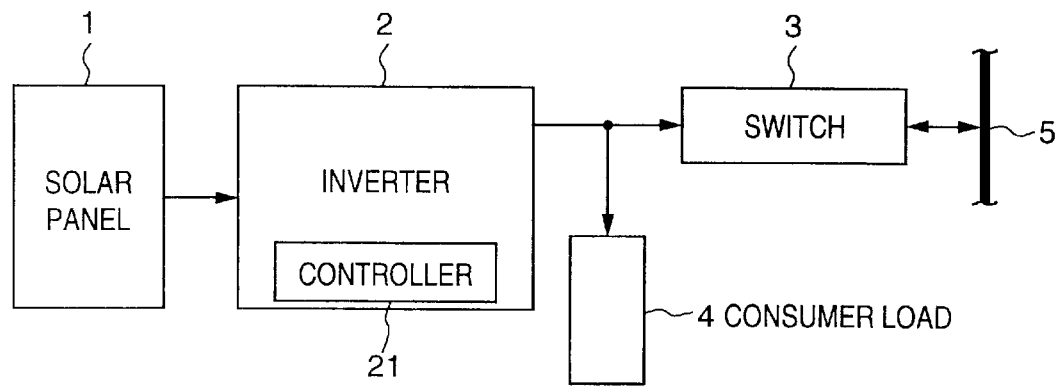
FIG. 6 is a block diagram showing the first example of a solar power generation apparatus.

FIG. 5 shows the arrangement of a solar power generation apparatus according to the third embodiment of the present invention. In the system shown in FIG. 5, branch switches 7 and 8 are respectively connected to consumer loads 4a and 4b, and a switching detector 9 is connected to one of the two branch switches. As the inverter 2, a transless inverter that produces a single-phase three-wire output (200 V) without using any insulating transformer is used. Such inverter is disclosed in, e.g, Papers of the Society of Solar Energy, p. 50, 1995.

In this embodiment, the self-support operation is started after both the switch 3 that disconnects the commercial AC power system 5 and the branch switch 7 that disconnects the consumer load 4a are open. With this operation, electric power can be supplied to the consumer load 4b alone in the self-support operation mode.

This embodiment is suitable for a case wherein the consumer loads 4a and 4b have different importance levels. Since the output from the solar panel 1 depends on the sunlight intensity, as a matter of course, the net load is preferably maintained to be relatively small so as to stably use electricity in the self-support operation mode. For this purpose, it is easy and reliable to disconnect a load with low importance level, and this embodiment is suitable for realizing this.

More specifically, since the self-support operation of the inverter 2 is started after it is detected that the branch switch 7 that supplies electric power to the nonessential consumer load 4a and the switch 3 that disconnects the commercial AC power system 5 are manually opened, the number of loads is limited, and stable power supply can be realized even under relatively weak sunlight.

Accordingly, in the control procedure of the CPU 211 in the third embodiment, step S3 shown in FIG. 3 need only be changed so that not only the open state of the switch 3 but also the open state of the branch switch 7 are detected, and the flow advances to step S4 if both the switches are open, and other steps can be the same as those in FIG. 3.

Modified Embodiment

In each of the above embodiments, a home solar power generation apparatus which uses a solar panel as a DC power source and a commercial AC power system as a main AC power system has been described. The DC power source may be DC power sources other than the solar panel such as a fuel battery, thermocouple, plasma generator, wind power generator, and the like in a cogeneration system. Also, the main AC power system may be AC power systems other than the commercial AC power system such as private AC power generator or the like in, e.g., a factory. Furthermore, when a plurality of inverter outputs are to be tied, a power generation system may be built while considering other inverter outputs as a main AC power system.

In each of the above embodiments, a single-phase power system has been exemplified. However, a combination of an inverter that outputs three-phase outputs, a three-phase switch, and a three-phase AC power system is also available. When three-phase signals having 120° phase differences from each other are prepared as the above-mentioned frequency voltage reference and current reference, electric power can be supplied to a power source such as a three-phase AC motor.

When electric power is supplied based on the single-phase three-wire system or three-phase electric power is supplied, one of these wires or phases may cause a power failure (open phase) or voltage drop. In order to operate the system of the present invention as expected even in such case, the above-mentioned power failure detector 217 may detect the states of the individual wires or phases to output the OR of these detection results to the CPU 211 as a power failure detection signal, or may detect the state of the main AC power system based on a signal obtained by synthesizing the voltages of the individual wires or phases.

As described above, according to the present invention, in the inverter which ties with the main AC power system and converts DC electric power into AC electric power, or in the solar power generation apparatus having such inverter, the inverter normally ties with the main AC power system, and when an abnormality such as a power failure of the main AC power system has occurred, it is detected that the switch for connecting the output of the inverter to the main AC power system is open, and thereafter, the self-support operation of the inverter is started. With this arrangement, the following effects can be obtained. That is, when an abnormality of the main AC power system has occurred:

(1) since the self-support operation is started after it is detected that the switch for connecting the main AC power system and the inverter output is opened, the self-support operation of the inverter can be safely and reliably performed without supplying any electric power to the main AC power system;

(2) since the indoor wiring can be directly used for supplying electric power to loads without preparing any self-support operation outlet in the inverter and without using any cord for connecting the outlet and loads, electric power can be easily used in the self-support operation mode; and (3) in the embodiment in which the self-support operation is started after the open state of the branch switch is detected, more stable power supply can be realized in the self-support operation mode.

The inverter and solar power generation apparatus according to the present invention with the above-mentioned excellent features are industrially very useful as solar power generation equipment that performs a self-support operation upon power failure of the commercial AC power system in, e.g., a disaster.

As many apparently widely different embodiments of the present invention can be made without departing from the spirit and scope thereof, it is to be understood that the invention is not limited to the specific embodiments thereof except as defined in the appended claims.

What is claimed is:

1. An inverter system comprising:
   an inverter connected between a DC power supply and a load, which operates to convert the DC power input from the DC power supply into AC power and to supply the AC power to the load, the load and inverter being connected at a node;
   a switch connected between a main AC power system and the load/inverter connection node;
   a first detector for detecting an open/closed state of the switch;
   a second detector for detecting a normal/abnormal state of the main AC power system; and
   a controller for controlling the operation of said inverter based on the detected states of the first and second detectors, wherein in a case where the inverter is in operation and the switch is in the closed state, the controller first causes the inverter to stop operating when the abnormal state of the main AC power system has been detected by the second detector, and then causes the inverter to restart operating when the open state of the switch has been detected by the first detector.

2. A system according to claim 1, wherein the switch comprises a mechanical switch which can be manually opened and closed.

3. A system according to claim 1, wherein the abnormal state comprises (1) a power failure, (2) an open phase, or (3) a voltage drop below a predetermined value of the main AC power system.

4. A system according to claim 1, wherein in the case where the inverter is in operation and the switch is in the closed state, the controller controls the operation of the inverter by using a current reference signal, and in the case where the inverter is in operation and the switch is in the open state, the controller controls the operation of the inverter by using frequency and voltage reference signals.

5. A system according to claim 1, wherein the DC power supply comprises a solar battery.

6. A system according to claim 1, wherein the main AC power system comprises a commercial AC power system.

7. A method for controlling an inverter system, the inverter system including an inverter connected between a DC power supply and a load, which operates to convert the DC power input from the DC power supply into AC power and to supply the AC power to the load, the load and inverter being connected at a node, a switch connected between a main AC power system and the load/inverter connection node, a first detector for detecting an open/closed state of the switch, and a second detector for detecting a normal/abnormal state of the main AC power system, the method comprising the steps of:

operating the inverter in the closed state of the switch;

stopping the operation of the inverter when the abnormal state of the main AC power system has been detected by the second detector; and restarting the operation of the inverter when the open state of the switch has been detected by the first detector.

8. A method according to claim 7, wherein the switch comprises a mechanical switch which can be manually opened and closed.

9. A method according to claim 7, wherein the abnormal state comprises (1) a power failure, (2) an open phase, or (3) a voltage drop below a predetermined value of the main AC power system.

10. A method according to claim 7, wherein in the case where the inverter is in operation and the switch is in the closed state, the operation of the inverter is controlled by using a current reference signal, and in the case where the inverter is in operation and the switch is in the open state, the operation of the inverter is controlled by using frequency and voltage reference signals.

11. A method according to claim 7, wherein the DC power supply comprises a solar battery.

12. A method according to claim 7, wherein the main AC power system comprises a commercial AC power system.

13. A solar power generation system comprising:

a solar battery which outputs DC power;

an inverter connected between the solar battery and a load, which operates to convert the DC power output from the solar battery into AC power and to supply the AC power to the load, the load and inverter being connected at a node;

a switch connected between a main AC power system and the load/inverter connection node;

a first detector for detecting an open/closed state of the switch;

a second detector for detecting a normal/abnormal state of the main AC power system; and a controller for controlling the operation of said inverter based on the detected states of the first and second detectors, wherein in a case where the inverter is in operation and the switch is in the closed state, the controller first causes the inverter to stop operating when the abnormal state of the main AC power system has been detected by the second detector, and then causes the inverter to restart operating when the open state of the switch has been detected by the first detector.

14. A system according to claim 13, wherein the switch comprises a mechanical switch which can be manually opened and closed.

15. A system according to claim 13, wherein the abnormal state comprises (1) a power failure, (2) an open phase, or (3) a voltage drop below a predetermined value of the main AC power system.

16. A system according to claim 13, wherein in the case where the inverter is in operation and the switch is in the closed state, the controller controls the operation of the inverter by using a current reference signal, and in the case where the inverter is in operation and the switch is in the open state, the controller controls the operation of the inverter by using frequency and voltage reference signals.

17. A method for controlling a solar power generation system, the solar power generation system including a solar battery which outputs DC power, an inverter connected between the solar battery and a load, which operates to convert the DC power output from the solar battery into AC power and to supply the AC power to the load, the load and inverter being connected at a node, a switch connected between a main AC power system and the load/inverter connection node, a first detector for detecting an open/closed state of the switch, and a second detector for detecting a normal/abnormal state of the main AC power system, the method comprising the steps of:

operating the inverter in the closed state of the switch;

stopping the operation of the inverter when the abnormal state of the main AC power system has been detected by the second detector; and restarting the operation of the inverter when the open state of the switch has been detected by the first detector.

18. A method according to claim 17, wherein the switch comprises a mechanical switch which can be manually opened and closed.

19. A method according to claim 17, wherein the abnormal state comprises (1) a power failure, (2) an open phase, or (3) a voltage drop below a predetermined value of the main AC power system.

20. A method according to claim 17, wherein in the case where the inverter is in operation and the switch is in the closed state, the operation of the inverter is controlled by using a current reference signal, and in the case where the inverter is in operation and the switch is in the open state, the operation of the inverter is controlled by using frequency and voltage reference signals.

21. A solar power generation system comprising:

a solar battery which outputs DC power;

an inverter connected between the solar battery and a second switch, the second switch being connected to a load, the inverter operating to convert the DC power output from the solar battery into AC power and to supply the AC power to the load through the second switch, the second switch being connected to the inverter at a node;

a first switch connected between a main AC power system and the load/second switch connection node;

a first detector for detecting respective open/closed states of the first and second switches;

a second detector for detecting a normal/abnormal state of the main AC power system; and a controller for controlling the operation of said inverter based on the detected states of the first and second detectors, wherein in a case where the inverter is in operation and the first and second switches are in the closed state, the controller first causes the inverter to stop operating when the abnormal state of the main AC power system has been detected by the second detector, and then causes the inverter to restart operating when the open states of the first and second switches have been detected by the first detector.

22. A system according to claim 21, wherein the first switch comprises a mechanical switch which can be manually opened and closed.

23. A system according to claim 21, wherein the abnormal state comprises (1) a power failure, (2) an open phase, or (3) a voltage drop below a predetermined value of the main AC power system.

24. A system according to claim 21, wherein in the case where the inverter is in operation and the first and second switches are in the closed state, the controller controls the operation of the inverter by using a current reference signal, and in the case where the inverter is in operation and the first and second switches are in the open state, the controller controls the operation of the inverter by using frequency and voltage reference signals.

25. A method for controlling a solar power generation system, the solar power generation system including a solar battery which outputs DC power, an inverter connected between the solar battery and a second switch, the second switch being connected to a load, the inverter operating to convert the DC power output from the solar battery into AC power and to supply the AC power to the load through the second switch, the second switch being connected to the inverter at a node, a first switch connected between a main AC power system and the load/second switch connection node, a first detector for detecting respective open/closed states of the first and second switches, and a second detector for detecting a normal/abnormal state of the main AC power system, the method comprising the steps of:

operating the inverter in the closed states of the first and second switches;

stopping the operation of the inverter when an abnormal state of the main AC power system has been detected by the second detector; and restarting the operation of the inverter when the open states of the first and second switches have been detected by the first detector.

26. A method according to claim 25, wherein the first switch comprises a mechanical switch which can be manually opened and closed.

27. A method according to claim 25, wherein the abnormal state comprises (1) a power failure, (2) an open phase, or (3) a voltage drop below a predetermined value of the main AC power system.

28. A method according to claim 25, wherein in the case where the inverter is in operation and the first and second switches are in the closed state, the operation of the inverter is controlled by using a current reference signal, and in the case where the inverter is in operation and the first and second switches are in the open state, the operation of the inverter is controlled by using frequency and voltage reference signals.

* * * * *